US008090762B2

(12) United States Patent
Deen et al.

(10) Patent No.: US 8,090,762 B2
(45) Date of Patent: Jan. 3, 2012

(54) EFFICIENT SUPER CLUSTER IMPLEMENTATION FOR SOLVING CONNECTED PROBLEMS IN A DISTRIBUTED ENVIRONMENT

(75) Inventors: Robert G. Deen, San Jose, CA (US); James H. Kaufman, San Jose, CA (US); Tobin J. Lehman, Cupertino, CA (US)

(73) Assignee: International Business Machines Corporation, Armonk, NY (US)

(*) Notice: Subject to any disclaimer, the term of this patent is extended or adjusted under 35 U.S.C. 154(b) by 1347 days.

(21) Appl. No.: 11/329,263

(22) Filed: Jan. 10, 2006

(65) Prior Publication Data

US 2007/0162914 A1 Jul. 12, 2007

(51) Int. Cl.
*G06F 15/16* (2006.01)
*G06F 15/163* (2006.01)
(52) U.S. Cl. .................. 709/201; 719/330
(58) Field of Classification Search .......... 719/330, 719/201
See application file for complete search history.

(56) References Cited

U.S. PATENT DOCUMENTS

| | | | |
|---|---|---|---|
| 4,920,487 A | 4/1990 | Baffes | |
| 2003/0069939 A1 | 4/2003 | Russell | |
| 2004/0244006 A1 | 12/2004 | Kaufman et al. | |
| 2005/0015571 A1 | 1/2005 | Kaufman et al. | |

OTHER PUBLICATIONS

Deen, Glenn; Lehman, T.; Kaufman, J. "The Almaden OptimalGrid Project". Proceedings of the Autonomic Computing Workshop 5th Annual International Workshop on Active Middleware Services (AMS, 2003), pp. 14-21.*
Leman et al. "OptimalGrid: Middleware for Automatic Deployment of Distributed FEM Problems on an Internet-Based Computing Grid". IEEE International Conference on Cluster Computing (Dec. 3, 2003). Hong Kong. Slides: 1-18. [retrieved from http://www.cs.hku.hk/cluster2003/presentation/technical/3A-1.pdf on Feb. 12, 2010].*
IBM alphaWorks, "Optimal Grid: A research prototype of grid-enabled middleware designed to hide complexities of partitioning, distributing, and load balancing." (Apr., 16, 2003). [retrieved from http://www.alphaworks.ibm.com/tech/optimalgrid on Feb. 5, 2010].*
Leman et al. "OptimalGrid: Middleware for Automatic Deployment of Distributed FEM Problems on an Internet-Based Computing Grid". Proceedings of the IEEE International COnference on Cluster Computing (Cluster '03) (Dec. 3, 2003). pp. 164-172.*
Webster's Third New International Dictionary of the English Language (Philip Gove ed., 1967), pp. 1977-1978.*
Deen, et al., ARC920050083US1, U.S. Appl. No. 11/328,829, Notice of Allowance Communication, Jan. 24, 2011, 7 pages.

(Continued)

*Primary Examiner* — S. Sough
*Assistant Examiner* — Brian Wathen
(74) *Attorney, Agent, or Firm* — Gibb I.P. Law Firm, LLC

(57) ABSTRACT

Embodiments herein present a system, method, etc. for an efficient super cluster implementation for solving connected problems in a distributed environment. More specifically, the system adapts computing latency to communication latency, wherein the system comprises VPPs wrapped within OCW layers. The VPPs represent a subset of an overall computer task; and, the OCW layers are adapted to enclose the VPPs. Specifically, the number of OCWs that enclose a VPP correspond to the number of computing iterations that may be locally executed by the VPP during an inter-VPP communication cycle. In addition, each VPP comprises collections of OPCs, wherein the OPCs comprise data, methods, and pointers to neighbors. The OPCs are indexed separately based on whether the OPC is part of an OCW layer.

16 Claims, 5 Drawing Sheets

OTHER PUBLICATIONS

Deen, et al., U.S. Appl. No. 11/328,829, Office Action Communication, Mar. 19, 2009, 17 pages.

Deen, et al., U.S. Appl. No. 11/328,829, Office Action Communication, Oct. 13, 2009, 15 pages.

* cited by examiner

810

910

EFFICIENT SUPER CLUSTER IMPLEMENTATION FOR SOLVING CONNECTED PROBLEMS IN A DISTRIBUTED ENVIRONMENT

CROSS-REFERENCE TO RELATED APPLICATION

The present application is related to a new U.S. Patent Application, filed concurrently, to Tobin J. Lehman, Robert Glenn Deen and James Kaufman, entitled "A Virtual Memory Technique For Efficiently Solving Connected Problems In A Distributed Environment", having application Ser. No. 11/325,829, assigned to the present assignee, and incorporated herein by reference.

BACKGROUND OF THE INVENTION

1. Field of the Invention

Embodiments herein present a system, method, etc. for an efficient super cluster implementation for solving connected problems in a distributed environment.

2. Description of the Related Art

There is a class of connected problems that involve problem sizes that span a single machine—common examples are Finite Element Model problems that involve simulating large physical systems. One solution to solving this class of problem is to partition the problem across multiple machines. When partitioning a connected problem across multiple machines, the boundary (the internal edges) between the problem pieces must be communicated between the physical machines. With a straight-forward solution to the problem partitioning, the boundary (the edges between the problem pieces) would be communicated between adjacent computers for each problem iteration step. In some cases, namely a slow communication link, it would be beneficial to be able to perform several problem iterations without having to communicate the edges. Presently, the prior art lacks an efficient system and method for managing the problem pieces so that multiple problem iterations may be performed without having to incur a communication step.

One main proposed solution is the "Super Cluster", wherein by thickening the problem piece edge one "layer", one iteration's worth of edge communication may be eliminated. Typically, the edge is thickened by the number of iterations one wishes to eliminate. The thicker edge is ad hoc and application specific. Despite its advantages, the "Super Cluster" solution works only for specific solutions in a static setting. It does not work as a general solution, nor does it work in an environment where the problems pieces change in size and shape dynamically. Furthermore, the "Thicker edges" creates a new arbitrary boundary in the problem data structure that is not well-formed, which results in internal chaos in the middleware as it tries to resolve issues with the boundaries being changed arbitrarily.

As such, a solution is required to restore order and regularity in the problem pieces. Also, a solution is needed that works for the dynamically changing problem pieces found in next generation grid middleware systems such as Optimal-Grid. Furthermore, this more flexible technique can be combined with other techniques (such as Grid Virtual Memory).

SUMMARY OF THE INVENTION

When solving large connected problems (such as Finite Element Model problems) that are distributed across multiple computers, it is common to employ a technique known as "Super Clusters", which implies that one holds more of the problem piece on a machine than is needed—the problem piece, plus several layers surrounding it are placed on a machine. That way it is possible to iterate the problem state multiple times without having to communicate the edge state between the computers sharing the problem boundary.

The solution to this problem results in rough edges in the problem and an increased complexity in the problem boundary management. Thus, embodiments of the invention use collections of original problem cells (also referred to herein as "OPC collections"), which are well-known collections of problem pieces, wherein the OPCs collections are used as the replicated edge unit. This provides a more efficient, more organized and more flexible solution than the classical solution which would simply add a single layer of cells to the Super Cluster for each communication iteration that is being absorbed.

The advantages of this method are several. First, it provides a problem-independent mechanism for solving the slow communication problem. Second, it provides greater flexibility in using the Super Cluster technique, as it can be modified while the problem is running (using greater or fewer layers depending on the needs of the communication layer). Third, because the OPC collection boundaries are already managed by the system, it requires very little extra code (or modification) to add this technique to an existing OptimalGrid system. Fourth, it can quickly be recalculated and reconfigured when the shape/size of a variable program partition changes. Finally, it works with other inventions recently created to improve node capacity for problem pieces.

Accordingly, embodiments herein present a system, method, etc. for an efficient super cluster implementation for solving connected problems in a distributed environment. More specifically, the system adapts computing latency to communication latency, wherein the system comprises variable program partitions (VPPs) wrapped within original problem cell collection wrapper layers (OCW layers). The VPPs represent a subset of an overall computer task; and, the OCW layers are adapted to enclose the VPPs. Specifically, the number of OCW layers that enclose a VPP correspond to the number of computing iterations that may be locally executed by the VPP during an inter-VPP communication cycle. In addition, each VPP comprises collections of original problem cells (OPCs), wherein the OPCs comprise data, methods, and pointers to neighbors. The OPCs are indexed separately based on whether the OPC is part of an OCW layer.

In other words, the system comprises a computing task, comprising computing task segments and wrappers adapted to enclose the computing task segments. The system further comprises wrapped computing task segments, each comprising a computing task segment and a wrapper. Specifically, the wrapper comprises a number of wrapper layers, wherein the number of wrapper layers corresponds to the number of computing iterations that may be locally processed within the wrapped computing task segment during an inter-computing task segment communication cycle. As such, each wrapped computing task segment can process multiple computing iterations during an inter-computing task segment communication cycle.

Moreover, the wrappers are adapted to store local communication data within each wrapped computing task segment, wherein the local communication data is read by a compute node. Further, the computing task segments and the wrapper layers comprise collections of computing task segment blocks. The wrapped computing task segments are adapted to rearrange the collections of computing task segment blocks within the wrapper layers when the size and/or shape of the computing task segment changes.

Embodiments of the invention further comprise a method for adapting computing latency to communication latency in a distributed computing environment, comprising wrapping VPPs with a selected number of OCW layers, wherein the number of OCW layers corresponds to the number of computing iterations that may be locally executed by the VPPs during an inter-VPP communication cycle. The method further comprises forming each VPP with collections of OPCs; and, forming each OPC with data, methods, and pointers to neighbors. The OPCs are indexed separately based on whether the OPC is part of an OCW layer.

In other words, the method partitions a computing task into computing task segments, wherein the computing task segments are enclosed within wrappers to produce wrapped computing task segments. The computing task segments and the wrappers comprise collections of computing task segment blocks. When the size or shape of a computing task segment changes, the collections of computing task segment blocks within the wrappers are rearranged. Furthermore, the enclosing of the computing task segments utilizes pre-existing components of the computing task and involves caching local communication data within the wrapped computing task segments.

Next, computing iterations are processed within the wrapped computing task segments, wherein the local communication data is read. Following this, an inter-computing task segment communication cycle is performed, wherein multiple computing iterations may be processed during the computing task segment communication cycle. Specifically, the number of wrapper layers that are used to enclose a computing task segment corresponds to the number of computing iterations that may be locally processed within the computing task segment during an inter-computing task segment communication cycle.

Accordingly, embodiments herein relate to managing VPPs, which are multiple collections of OPCs. OPCs are essentially the unit cells of a distributed computing job, wherein the OPCs are on the edges of a VPP and serve as intercommunication nodes to buffer data being sent back and forth to and from other VPPs. Entire edges can be swapped between VPPs to transfer information needed by different VPPs. The set of edges are referred to as an OCW. The problem is that communication latency may exceed computing latency. The solution is to use multiple layers in an OCW so that a VPP can process multiple iterations of a computing job while waiting for communication updates to complete, with each layer of the "onion", i.e., the OCW, handling data needed for a computing iteration. The VPP need not be "regular", i.e., rectangular, though this arrangement may have advantages.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS OF THE INVENTION

Figure 1:
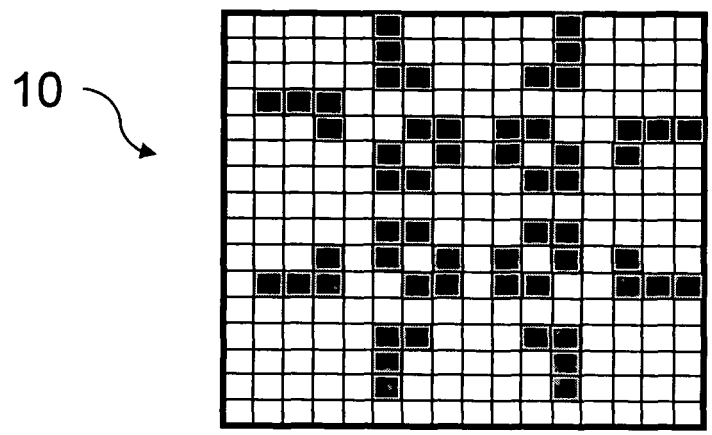
FIG. 1 illustrates a grid of filled and un-filled cells.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

Embodiments herein relate to managing VPPs, which are multiple collections of OPCs. OPCs are essentially the unit cells of a distributed computing job, wherein the OPCs are on the edges of a VPP and serve as intercommunication nodes to buffer data being sent back and forth to and from other VPPs. Entire edges can be swapped between VPPs to transfer information needed by different VPPs. The set of edges are referred to as an OCW. The problem is that communication latency may exceed computing latency. The solution is to use multiple layers in an OCW so that a VPP can process multiple iterations of a computing job while waiting for communication updates to complete, with each layer of the "onion", i.e., the OCW, handling data needed for a computing iteration. The VPP need not be "regular", i.e., rectangular, though this arrangement may have advantages.

Embodiments of the invention apply applications that are so large they must be divided and run on multiple (distributed) computers. Furthermore, the problems in these applications are connected, meaning that the solving of the problem will require communication between the machines to share the state of the individual problem pieces. OptimalGrid is a grid middleware package available from International Business Machines Corporation, located in Armonk, N.Y., USA, that was designed to solve this class of problems. OptimalGrid manages the distribution of the problem pieces and the communication of the problem piece state between the computers working on the problem. As such, the OptimalGrid system is referred to in the detailed description of embodiments of the invention as an exemplary middleware package for solving connected problems in a distributed environment.

In order to keep the OptimalGrid system balanced—to keep it operating as close to optimal as possible, given the resources and the overall state of the system—the average VPP computation time should be kept roughly the same as the average VPP communication time. That is, an entire iteration of a VPP should be computed in the same time it takes to communicate the edges between the VPPs. If the computation time is slower than the communication time, then the size of the VPP should be reduced to shorten the computation time (assuming that more VPP pieces can be distributed across more compute nodes). If the communication time is slower than the computation time, there is typically no way to speed up communication. The only option is to increase the computation time (to match communication) by increasing the size of the problem piece that is being computed. However, this is a limited solution. The size of the VPP can only be increased so far before real memory is expended in the compute node. Therefore, another solution is needed to balance the system with respect to a slow communication time.

Accordingly, embodiments of the invention describe a system and method for reducing the communication cost of sending edges between the VPPs. By making the edge that is communicated thicker than what would be sent for a single iteration, the problem can actually be iterated multiple times without having to incur the communication of sending edges between VPPs at every iteration cycle. This effectively makes the VPP larger, which allows the selection of virtually any VPP size (growing it either by memory or by iteration cycles) so that any communication speed can be matched. Furthermore, using this technique, adaptation to dynamic system and network fluctuations is allowed.

More specifically, embodiments of the invention pertain to the mechanism by which the communication between VPPs is managed. To illustrate this, the detailed description of embodiments of the invention uses a simple variable size problem as an example—The Game of Life, available from Mathworld, which is a form of cellular automaton. As illustrated in FIG. 1, the life cellular automaton is run by placing a number of filled cells on a two-dimensional grid 10. Each generation then switches cells on or off depending on the state of the cells that surround it. The rules are defined as follows. All eight of the cells surrounding the current one are checked to see if they are on or not. Any cells that are on are counted, and this count is then used to determine what will happen to the current cell: (1) Death: if the count is less than two or greater than three, the current cell is switched off; (2) Survival: if the count is exactly two, or the count is exactly three, and the current cell is on, the current cell is left unchanged; and (3) Birth: if the current cell is off and the count is exactly three, the current cell is switched on.

Figures 2A, 2B:
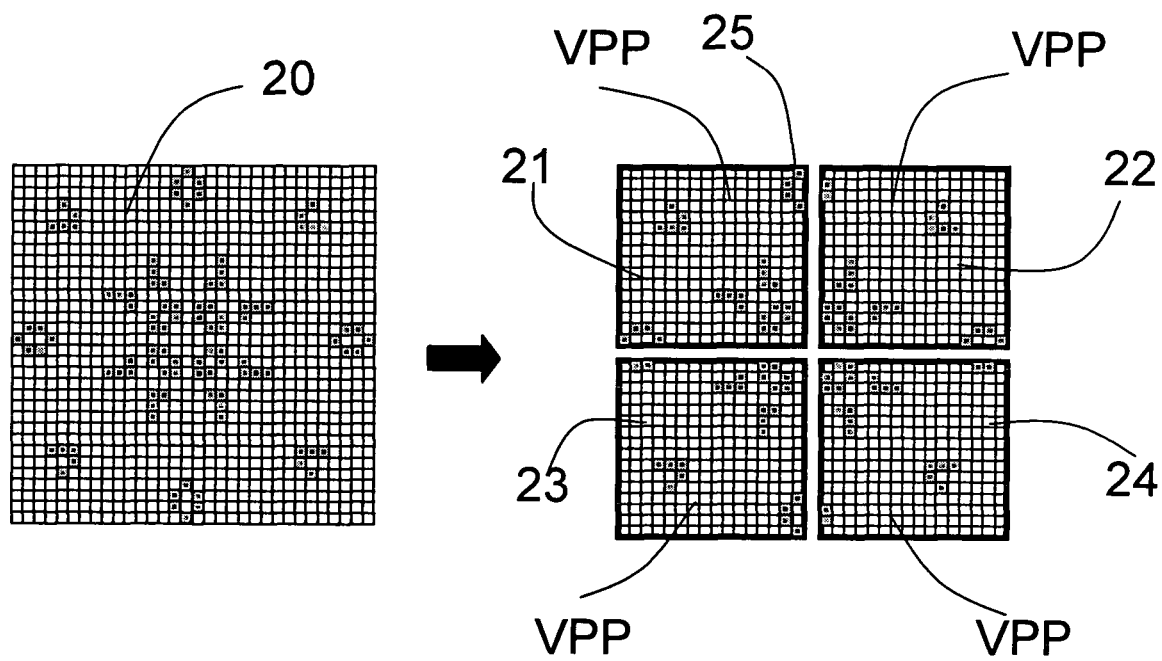
FIG. 2(a) illustrates a computing task.
FIG. 2(b) illustrates computing task segments.

When a single computer application grows in size to the point where it can no longer be held on a single computer, then one way to run the application is to break up the problem into pieces, where the individual pieces reside on separate computers and the computers communicate with each other to pass along the application information from the edges—the internal boundaries of the data structure. In FIGS. 2(a) and 2(b), a larger grid 20 (i.e., the overall computer problem) is illustrated which is too large for one machine. Thus, the problem is split into four equal size segments 21, 22, 23 and 24—the variable program partitions (VPPs), where each VPP will be run on a separate computer. The VPPs are further split into collections of original program cells 25 (OPCs) (each individual square in the VPPs represent an OPC collection).

Figure 3:
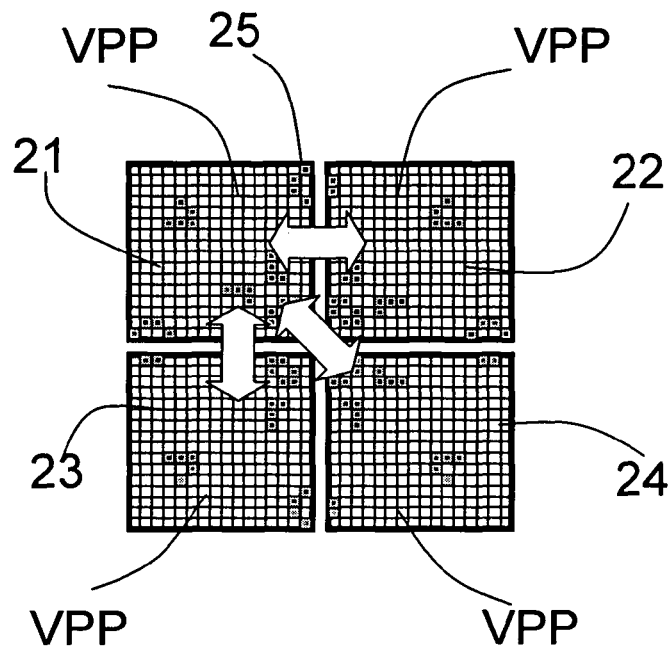
FIG. 3 illustrates communication between computing task segments.
Figure 4:
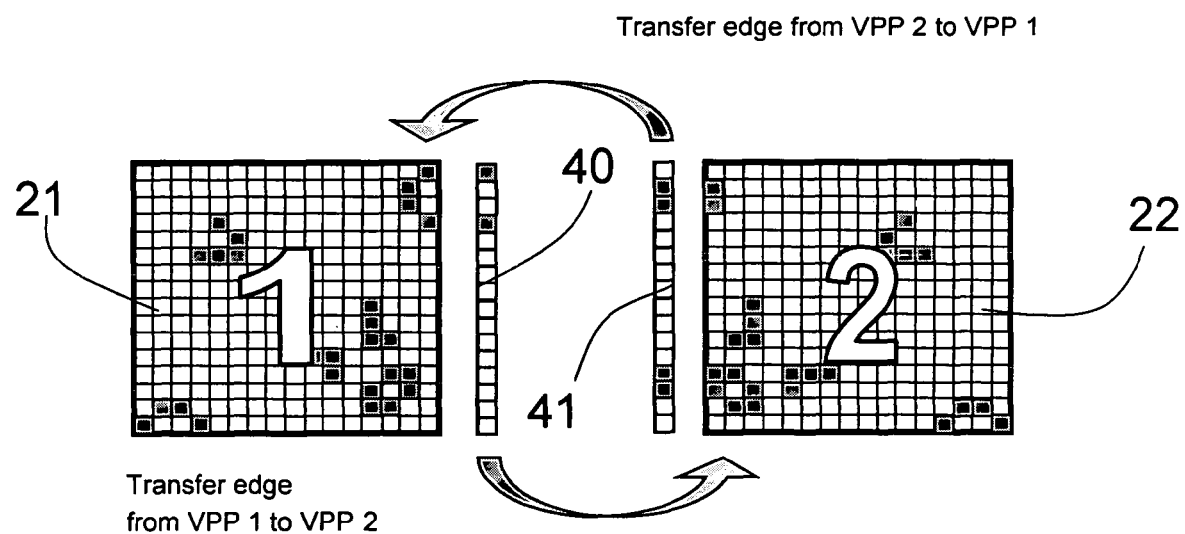
FIG. 4 illustrates a single layer edge swap between computing task segments.

When the problem is divided across computers, the state of the problem on one computer must be transmitted to its neighboring computer (FIG. 3). This is not a significant problem however, as only the edges of each VPP need to be transmitted to its neighboring computer, not the entire VPP. FIG. 4 shows a single layer edge swap between edges 40 and 41. For each internal boundary, the place where the problem data structure is split across machines, the OptimalGrid middleware manages the transfer of the edges. This allows the application software (the Game of Life software, in this example) to be completely unaware of the OptimalGrid mechanism that is managing the inter-machine communication. The application software is only aware of its own data structures (provided by OptimalGrid) that contain the cell state and the pointers to the neighbor cells.

Figure 5:
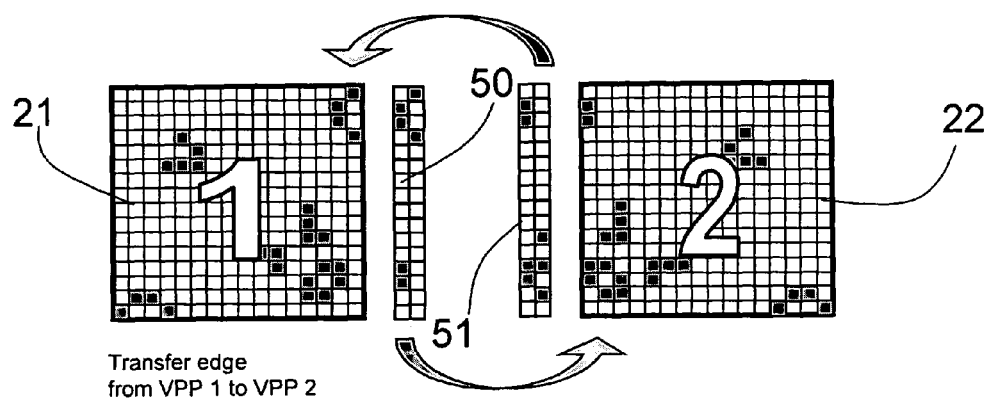
FIG. 5 illustrates a double layer edge swap between computing task segments.

Each time a layer is added to the edge that is transferred between the VPPs, another iteration cycle is allowed to be computed without requiring an edge transfer between the VPPs. FIG. 5 shows a double layer edge transfer between VPPs between double layer edges 50 and 51. For the simple case, as shown here, this looks easy and obvious. The thicker edge seems to magically solve the communication problem. However, there is more to the problem. Rather than an example where there are only two VPPs and a single edge, FIGS. 6 and 7 illustrate a more complex system that has internal VPPs 60, 700, 710, 720 and 730 (edges on all sides 61, 62, 63, 64, 701, 702, 703, 704, 711, 712, 713, 714, 721, 722, 723, 724, 731, 732, 733, and 734) and edges that can cross multiple VPP boundaries (65, 66, 67, 68, 705, 706, 707, 708, 715, 716, 717, 718, 725, 726, 727, 728, 735, 736, 737, and 738).

Figure 6:
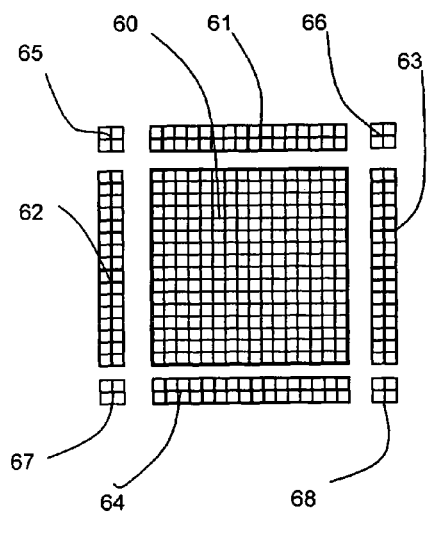
FIG. 6 illustrates an internal computing task segment with a thick edge.
Figure 7:
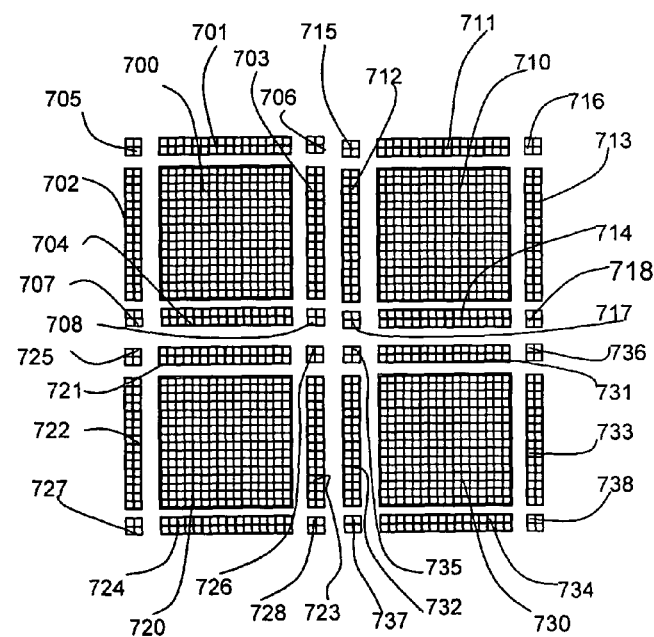
FIG. 7 illustrates a group of internal computing task segments with thick edges.

In FIG. 6, an interior VPP 60 (one that has shared boundaries 61, 62, 63, 64, 65, 66, 67, and 68 on all sides) is shown with an additional thick edge all the way around. The additional thick edge must be taken from many other VPPs (including the diagonal ones, not just the North, South, East and West neighbors. Further, the OPCs that need to be copied from the remote VPPs may not necessarily be easily retrieved or even identified. The small collections of corner OPCs 65, 66, 67, and 68 most likely require special attention and identification when the problem is laid out initially.

If the problem was allocated statically and uniformly, then part of the difficulty (and complexity) would be eliminated. Along with the various problem boundaries, the Super Cluster thick edge boundaries would also be set at problem allocation time (FIG. 7). However, this is not the case for more sophisticated problem solving systems like OptimalGrid. In the OptimalGrid system, VPPs change over time in size and shape. It would not be possible to allocate any edge information statically.

Figure 8:
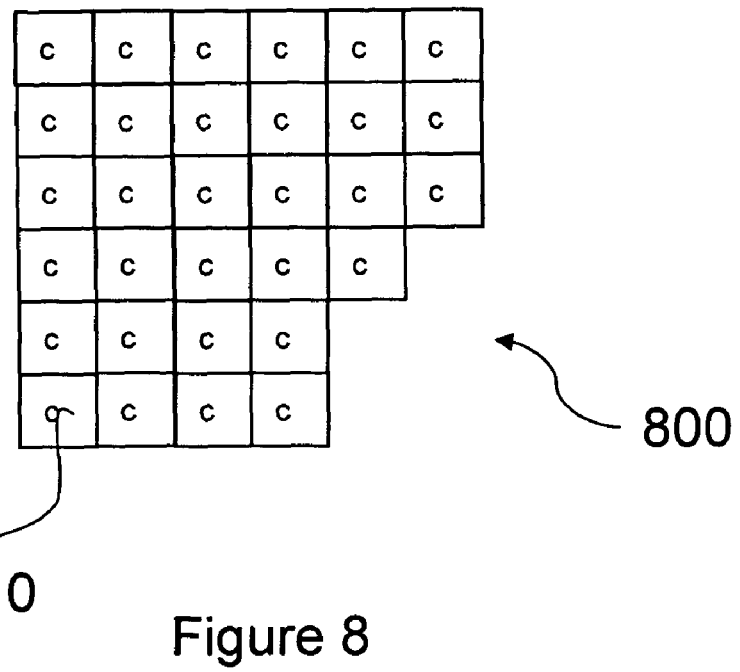
FIG. 8 illustrates a computing task segment comprising collections of computing task segment blocks.

A more accurate depiction of an OptimalGrid VPP is shown in FIG. 8. More specifically, VPPs 800 of embodiments of the invention comprise multiple sub-structures, called OPC collections 810. The OPC collections 810 are fixed size elements, whose boundaries are determined at problem configuration time. The boundaries of the OPC collections 810 are the only boundaries that may be used for the boundaries of the VPPs 800. When the boundary of an OPC collection 810 is internal to a VPP 800, the boundary has little or no effect on the structure or the management of the VPP 800.

Figure 9:
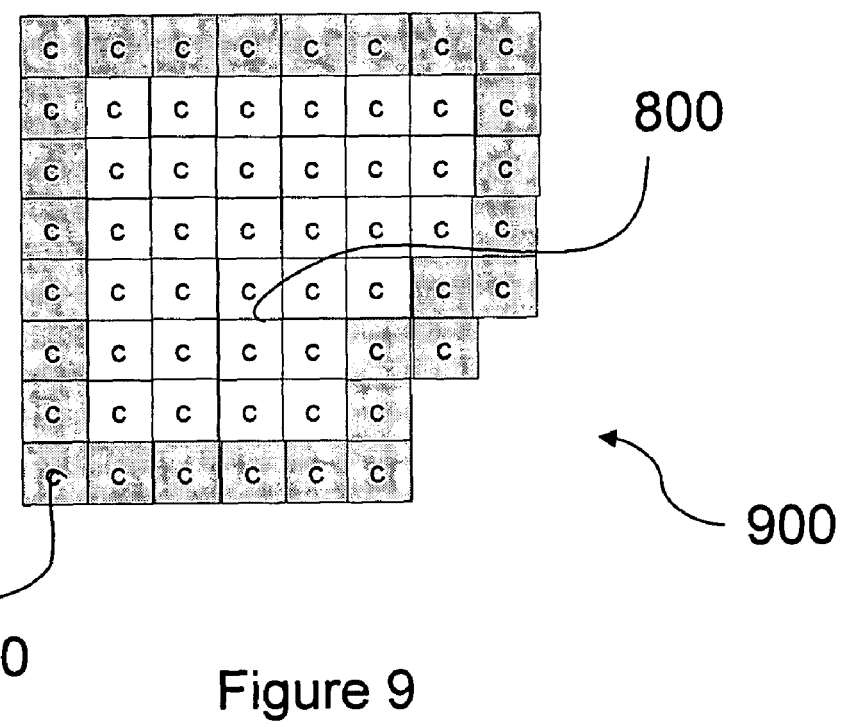
FIG. 9 illustrates a wrapped computing task segment.

FIG. 9 shows a wrapped VPP 900, comprising an irregular shaped VPP 800 surrounded by an OPC collection wrapper (OCW) 910. By using the OPC collections 810 to wrap a VPP 800, rather than individual OPC layers (which is the current Super Cluster method), the following four requirements established by OptimalGrid are fulfilled. First, established boundaries built into the problem pieces are used so that little or no extra work needs to be done to use this technique, thereby resulting in cheap implementation. Second, embodiments of the invention work with the middleware, not with a specific application. Consequently, the solution is general purpose and can be used with most problems and likely all spatial problems. Third, pre-existing sub-pieces of the problem are used (i.e., OPC collections 810) to create the wrapper. Further, these pieces can be arranged dynamically as the sizes and/or the shapes of the VPPs 800 change over time. Fourth, embodiments of the invention work with the natural OptimalGrid design, and so it works in concert with other OptimalGrid techniques, such as, for example, Grid Virtual Memory.

In addition, this solution has the following characteristics. Each OPC layer of an OCW 910 acts as a multiplier of the size of a VPP 800. For example, using ten OPC layers of the wrapper would allow a compute agent to compute a VPP 800 ten times without resorting to communication. There is a negative factor. The amount of memory to hold an OCW 910 (for VPP 800 and OPC collection 810 sizes similar to those shown in FIG. 9) may be a significant portion of a VPP 800 size itself. For small sized VPPs 800, the OCWs 910 could actually exceed the size of the VPPs 800. For average sized VPPs 800, the OCWs 910 could be the same size. However, the multiplier effect of the OCWs 910 is the dominant factor.

This solution is expected to be employed by autonomic systems, such as, for example, OptimalGrid. When the system detects a slow communication link between two or more computers, this solution may be employed. To employ this solution, the system (e.g. OptimalGrid) pads the VPPs 800 with one layer of OPC collections 810 for each slow communication link. It will often be the case that if a computer has one slow link, then most or all of its links will also be slow. In the common case, when all of the links are slow, an entire VPP 800 would be wrapped, as in FIG. 9. Then, the system would decide how many OPC layers it should use to offset the communication link speed. Whereas a layer of an OCW 910 could reduce the size of a VPP 800 by as much as half, each layer used in an OCW 910 multiplies the size of a VPP 800 by one. Thus, a VPP 800 with a starting size of "$S_{old}$" can be grown by using more layers in an OCW 910. And, the effective size of a VPP 800 is the starting size of the VPP 800 divided by the possible shrinkage factor of an OCW 910. Therefore, the new size of the VPP 800 can be determined by the simple formula: $S_{new}$=NumOPCLayers*($S_{old}/A_{shrinkage}$).

Embodiments of the invention provide the ability to grow the effective size of a VPP 800 to just about any needed size. Since the number of OPC layers in an OCW 910 is the multiplier of the size of a VPP 800, multiplier numbers of 10×, 50×, 100× or even more are assumed. However, it is not beneficial to increase the effective size of a VPP 800 so that its computation time will be greater than the existing communication time. A VPP 800 stops growing when the computation time and communication time roughly match.

There can be an additional optimization to be done using this solution of speeding up communication. When compute resources are infinite (i.e., there are enough computers available to handle every OPC collection 810 in the problem), then it is possible to achieve maximum parallelization of the problem using the minimum problem piece as the core, each wrapped in the OPC collections 810. The amount of network communication messages would be 1/$Num_{OPCLayers}$. So, for example, in the simple two-dimensional case, with the OPC collections 810 as simple square tiles, two-hundred OPCs on a side, the communication speedup would be two-hundred times less than the "normal" communication cost.

When there are infinite compute resources, the maximum amount of computers can be allocated for maximum parallelism. Given the compute time is small, the system implicitly stays communication bound. Using any possible solution to reduce communication time (at the cost of memory and CPU, which in this case would otherwise be un-utilized anyway) is a benefit.

Thus, a system of embodiments of the invention comprises the OPCs, the VPPs 800, and the OPC collections 810. More specifically, an OPC is analogous to a Byte of data in a traditional computer. It is, by definition, an object representing the smallest executable unit of data or code. An abstract OPC contains data, method(s), and pointers to neighbors. The data might be a byte of user data. The methods represent executable code. The pointers to neighbors indicate the relative location of other OPCs (local or remote) and can be null for an isolated independently calculable OPC. If the pointers to neighbors are not null the problem is connected and the OPCs must exchange data with other OPCs to do work. Hence the entire application may be described as a graph.

A VPP 800 is like a page and like a separate program thread. Each VPP 800 contains many OPCs. A VPP 800 is a unit of work assignable to a compute agent or grid node. The VPPs 800 "know" about dependencies with other VPPs 800 or other threads (running or otherwise). One or more VPPs 800 are assigned to compute agents. The VPPs are pieces of the entire grid "program". The problem builder creates the pieces at program load time. Pieces may be redefined at run time by the ProblemReBuilder.

The OPC collections 810 are analogous to "segments". An OPC collection 810 is an object intermediate in size between a tiny OPC and a large VPP 800. An OPC collection 810 contains one or more OPCs. A VPP 800 is made of one or more OPC collections 810. During load balancing, the VPPs 800 assigned to compute agents may be resized on the fly by exchanging or moving the OPC collections 810 between the VPPs 800. The OPC collections 810 "know" about dependencies with other OPC collections 810 (running or otherwise). Because the OPC collections 810 are defined at program load time by the problem builder, dependencies between problem pieces need not be redefined or remapped at the individual OPC level when load balancing. An update is performed to determine which of the VPPs 800 contain which of the OPC collections 810.

A system of embodiments of the invention further comprises an autonomic program manager (APM), a white board communication system, compute agents (CAs), a problem builders, and a ProblemReBuilder. The APM plays the role of grid controller, grid monitor, and grid goss scheduler. The APM is a coordinator for a running application on a grid. It does not administer the grid hardware, it monitors and optimizes the running application and is responsible for automatic functionality like dynamic load balancing (self optimizing) and failure recovery (self healing). It monitors performance of the running grid "program". The performance measurements are made by other sources (e.g., the compute agents) and fed back to the APM via a communication system. The APM knows the relative order or priority of each VPP 800 based on dependencies discovered by the problem builder (or ProblemReBuilder) and encoded in the VPPs 800 themselves. The APM uses performance data monitored continually or at each iteration to produce a forward-looking schedule of remaining work based on real experience. It can redistribute and reprioritizes the VPPs 800 themselves and the compute agent-VPP assignments.

Further, grid nodes, compute agents, and the APM must communicate with each other. They must communicate to execute the program (for connected programs); they must communicate program data (input output); and, they must exchange control data, assignments, and performance diagnostics. For this purpose, embodiments herein use a communication system that is also like a queryable in memory grid database. This is based on the IBM Tspaces Whiteboard technology available from International Business Machines Corporation, located in Armonk, N.Y., USA. The use of a whiteboard allows data sources and data synchs to exchange messages that are addressable, queryable by field, broadcast (addressed to "all"), and to register for callbacks or message events and message availability. Distributed whiteboard architecture is used to allow the system to scale to arbitrarily large grid size. The communication mechanism provides the required feedback for a self-managing virtual grid processor.

The CAs are nodes or processors on the grid. They may also be virtual machines. CAs are like processors that run parallel threads with known dependencies (the VPPs 800 are like the thread and know their dependencies on other threads). A CA is like a process but also like a local scheduler. The CA is given (by the APM) an assignment or schedule of work to do. This is a hashtable or map with a list of the VPPs 800 to run (set of OPC collections 810) and an address list of where to find each of them. The VPPs 800 assigned to a CA may be stored locally in memory, on disk, or in a remote datasource, like TSpaces or a database. The CA also has a list of where to find the VPPs 800 that the VPP 800 assigned to it are connected to (where to find known dependencies).

Moreover, each CA has local intelligence and takes recommendations or an assignment schedule from the APM. Based on real results during execution, a CA can opportunistically take on more work; notify the APM (and/or neighbors) there is a problem; and, if they are too busy, they can put work up for bid or ask for help. Each CA has a list of the VPPs 800 that enables batch scheduling (apm+batch scheduler allows predictive scheduling and real time loadbalancing). This also enables continuous load balancing (no need to wait for end of sequence). This applies to independent or to dependent VPPs 800.

The problem builder is like the grid compiler. The problem builder divides the application into threads or the VPPs 800 at program load time. The VPPs 800 are collections of OPCs that may be organized into groups or the OPC collections 810.

The ProblemReBuilder is like a real time reoptimizing compiler. This optional component can be used to resize the VPPs 800 on the fly at run time. The VPPs 800 are stored on the whiteboard as groups of the OPC collections 810. Individual OPC collections 810 may be simply reassigned from one VPP 800 to another.

Accordingly, embodiments herein present a system, method, etc. for an efficient super cluster implementation for solving connected problems in a distributed environment. More specifically, the system adapts computing latency to communication latency, wherein the system comprises VPPs 800 wrapped within OCWs 910. The VPPs 800 represent a subset of an overall computer task; and, the OCWs 910 are adapted to enclose the VPPs 800. Specifically, the number of layers in an OCW 910 that encloses a VPP 800 correspond to the number of computing iterations that may be locally executed by the VPP 800 during an inter-VPP communication cycle. In addition, each VPP 800 comprises collections of original problem cells (OPCs), wherein the OPCs comprise data, methods, and pointers to neighbors. The OPCs are indexed separately based on whether the OPC is part of an OCW 910.

In other words, the system comprises a computing task, comprising computing task segments (i.e., the VPPs 800) and wrappers (i.e., the OCWs 910) adapted to enclose the computing task segments. As discussed above, each computing task segment of the overall computing task is run on a separate computer, wherein the wrappers are used to cluster the computing task segments. The system further comprises wrapped computing task segments (i.e., the wrapped VPP 900), wherein each wrapped computing segment comprises a computing task segment and a wrapper.

More specifically, the wrapper comprises a number of wrapper layers, wherein the number of wrapper layers corresponds to the number of computing iterations that may be locally processed within the wrapped computing task segment during an inter-computing task segment communication cycle. As such, each wrapped computing task segment can process multiple computing iterations during an inter-computing task segment communication cycle. For example, using ten wrapper layers would allow a compute agent to compute the computing task segment ten times without resorting to communication. Further, as discussed above, the wrapped computing task segments work with the middleware, not with a specific application, so they are general purpose. The wrapped computing task segments also work with the natural OptimalGrid design, and so they work in concert with other OptimalGrid techniques (such as, for example, Grid Virtual Memory).

Moreover, the wrappers are adapted to store local communication data within each wrapped computing task segment, wherein the local communication data is read by a compute node. Thus, it appears as if a compute node is talking to remote nodes when the compute node is actually reading data out of a local cache. Consequently, space is traded for communication speedup.

Furthermore, the computing task segments and the wrapper layers comprise collections of computing task segment blocks (i.e., OPC collections 810), wherein the wrapped computing task segments are adapted to rearrange the collections of computing task segment blocks within the wrapper layers when the size and/or the shape of the computing task segment changes. Therefore, as discussed above, established boundaries built into the problem pieces are used. As such, little or no extra work needs to be done to use this technique, thereby resulting in cheap implementation. Moreover, pre-existing sub-pieces of the problem (i.e., OPC collections 810) are used to create the wrapper, wherein these pieces can be rearranged dynamically as the size and/or the shape of the computing task segment changes over time.

Embodiments of the invention further comprise a method for adapting computing latency to communication latency in a distributed computing environment, comprising wrapping the VPPs 800 with the OCWs 910, wherein the number of layers within the OCWs 910 correspond to the number of computing iterations that may be locally executed by the VPPs 800 during an inter-VPP communication cycle. The method further comprises forming each VPP 800 with collections of OPCs; and, forming each OPC with data, methods, and pointers to neighbors. The OPCs are indexed separately based on whether the OPC is part of an OCW 910.

In other words, the method partitions a computing task into computing task segments (i.e., the VPPs 800), wherein the computing task segments are then enclosed within wrappers (i.e., the OCWs 910) to produce wrapped computing task segments (i.e., the wrapped VPPs 900). Again, as discussed above, each computing task segment of the overall computing task is run on a separate computer, wherein the wrappers are used to cluster the computing task segments.

The computing task segments and the wrappers comprise collections of computing task segment blocks (i.e., the OPC collections 810), wherein the collections of computing task segment blocks within the wrappers are rearranged when the size and/or the shape of a computing task segment changes. Therefore, as discussed above, by using collections of the computing task segment blocks as the wrapper, rather than individual OPC layers (which is the current Super Cluster method), the wrapped computing task segments work with the middleware, not only with a specific application. As such, the wrapped computing task segments are general purpose and can be used with most problems (likely all spatial problems). Moreover, the wrapped computing task segments work with the natural OptimalGrid design, and so it works in concert with other OptimalGrid techniques (such as, for example, Grid Virtual Memory).

Furthermore, the enclosing of the computing task segments utilizes pre-existing components of the computing task and involves caching local communication data within the wrapped computing task segments. Therefore, established boundaries built into the problem pieces are used. As such little or no extra work needs to be done to use this technique, thereby resulting in cheap implementation.

Next, computing iterations are processed within the wrapped computing task segments, wherein the local communication data is read. Again, as discussed above, it appears as if a compute node is talking to remote nodes when the compute node is actually reading data out of a local cache. Consequently, space is traded for communication speedup.

Following this, an inter-computing task segment communication cycle is performed, wherein multiple computing iterations may be processed during the computing task segment communication cycle. Specifically, the number of wrapper layers that are used to enclose a computing task segment corresponds to the number of computing iterations that may be locally processed within the computing task segment during an inter-computing task segment communication cycle. As discussed above, each layer of the wrapper acts as a multiplier of the size of the computing task segment. For example, using ten wrapper layers would allow a compute agent to compute the computing task segment ten times without resorting to an inter-computing task segment communication cycle.

Figure 10:
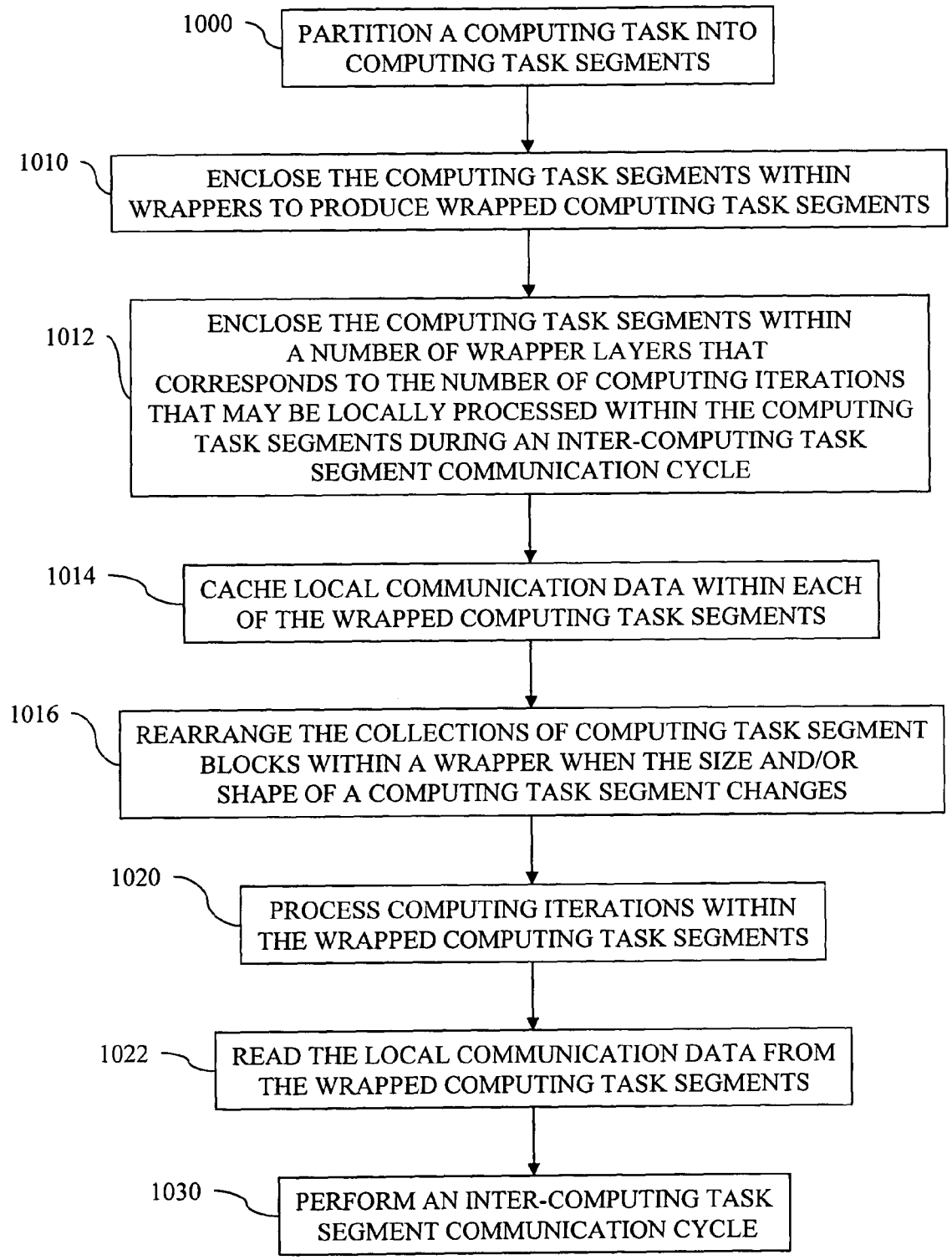
FIG. 10 illustrates a flow diagram of a method of the invention.

FIG. 10 illustrates a flow diagram of a method for an efficient super cluster implementation for solving connected problems in a distributed environment. The method begins by partitioning a computing task into computing task segments (item 1000) and enclosing the computing task segments within wrappers to produce wrapped computing task segments (item 1010). Once more, as discussed above, each computing task segment of the overall computing task is run on a separate computer, wherein the wrappers are used to cluster the computing task segments.

The production of wrapped computing task segments further comprises items 1012, 1014, and 1016. More specifically, the computing task segments are enclosed within a number of wrapper layers, wherein the number of wrapper layers corresponds to the number of computing iterations that may be locally processed within the computing task segments during an inter-computing task segment communication cycle (item 1012). For example, using ten wrapper layers would allow a compute agent to compute the computing task segment ten times without resorting to an inter-computing task segment communication cycle.

In addition, local communication data is stored within each of the wrapped computing task segments (item 1014); and, the collections of computing task segment blocks within a wrapper are rearranged when the size and/or the shape of a computing task segment changes (item 1016). In the OptimalGrid system, computing task segments change over time in size and shape; and, it would not be possible to allocate any edge information statically using the Super Cluster solution.

Next, the method processes computing iterations within the wrapped computing task segments (item 1020). This comprises reading the local communication data from the wrapped computing task segments (item 1022). Again, as discussed above, it appears as if a compute node is talking to remote nodes when the compute node is actually reading data out of a local cache. Consequently, space is traded for communication speedup.

Following this, an inter-computing task segment communication cycle is performed (item 1030). As further discussed above, the solving of extremely large computing tasks typically requires communication between multiple machines to share the state of the individual task pieces. Embodiments of the invention keep the OptimalGrid system operating as close to optimal as possible by keeping the average computing task segment computation time roughly the same as the average computing task segment communication time.

Accordingly, embodiments herein relate to managing VPPs, which are multiple collections of OPCs. OPCs are essentially the unit cells of a distributed computing job, wherein the OPCs are on the edges of a VPP and serve as intercommunication nodes to buffer data being sent back and forth to and from other VPPs. Entire edges can be swapped between VPPs to transfer information needed by different VPPs. The set of edges are referred to as an OCW. The problem is that communication latency may exceed computing latency. The solution is to use multiple layers in an OCW so that a VPP can process multiple iterations of a computing job while waiting for communication updates to complete, with each layer of the "onion", i.e., the OCW, handling data needed for a computing iteration. The VPP need not be "regular", i.e., rectangular, though this arrangement may have advantages.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

What is claimed is:

1. A computer-implemented method for matching computing latency to communication latency in a distributed computing environment, comprising:

wrapping, by a computer, a variable program partition with a selected number of original program cell collection wrapper layers when said communication latency is slower than said computing latency, each original program cell collection wrapper layer corresponding to a number of computing iterations that are locally executed by said variable program partition during an inter-variable program partition cycle, said communication latency equaling a multiple, equal to said selected number, of inter-variable program partition cycles that match said computing latency, said variable program partition representing a subset of an overall computer task, and said original program cell collection wrapper layers enclosing said variable program partition.

2. The method according to claim 1, further comprising forming said variable program partition with a number of collections of original program cells.

3. The method according to claim 2, further comprising forming each of said original program cells with data, methods, and pointers to neighbors.

4. The method according to claim 2, further comprising indexing said original program cells separately based on whether said original program cells comprise a portion of said original program cell collection wrapper layers.

5. A computer-implemented method for matching computing latency to communication latency in a distributed computing environment, comprising:
   partitioning, by a computer, a computing task into computing task segments
   enclosing, by said computer, each of said computing task segments within wrappers to produce wrapped computing task segments;
   processing, by said computer, computing iterations within each of said wrapped computing task segments; and
   performing, by said computer, an inter-computing task segment communication cycle as part of said computing task within said distributed computing environment,
   said enclosing each of said computing task segments comprising enclosing each of said computing task segments within a number of wrapper layers, when said communication latency is slower than said computing latency,
   said number of said wrapper layers corresponding to a number of said computing iterations that are locally processed within each of said wrapped computing task segments during said performing of said inter-computing task segment communication cycle.

6. The method according to claim 5, wherein said processing of said computing iterations comprises processing at least one of said computing iterations during said performing of said inter-computing task segment communication cycle.

7. The method according to claim 5, wherein said enclosing of said computing task segments comprises caching local communication data within each of said wrapped computing task segments.

8. The method according to claim 7, wherein said processing of said computing iterations comprises reading said local communication data from said wrapped computing task segments.

9. The method according to claim 5, wherein said wrappers comprise collections of computing task segment blocks, and wherein said method further comprises rearranging said collections of computing task segment blocks when at least one of a size and a shape of one of said computing task segments changes.

10. The method according to claim 5, wherein said enclosing of said computing task segments comprises utilizing pre-existing components of said computing task.

11. A computer-implemented method for matching computing latency to communication latency in a distributed computing environment, comprising:
   determining said communication latency between edges of a first variable program partition and a second variable program partition is slower than said computing latency of said first variable program partition; and
   wrapping, by a computer, said first variable program partition with a selected number of original program cell collection wrapper layers, each original program cell collection wrapper layer corresponding to a number of computing iterations that are locally executed by said first variable program partition during an inter-variable program partition cycle, said communication latency equaling a multiple, equal to said selected number, of inter-variable program partition cycles that match said computing latency of said first variable program partition.

12. The method according to claim 11, said first variable program partition representing a subset of an overall computer task in said distributed computing environment.

13. The method according to claim 11, said original program cell collection wrapper layers enclosing said first variable program partition.

14. The method according to claim 11, further comprising forming said first variable program partition with a number of collections of original program cells.

15. The method of claim 14, further comprising forming each of said original program cells with data, methods, and pointers to neighbors.

16. The method according to claim 14, further comprising indexing said original program cells separately based on whether said original program cells comprise a portion of said original program cell collection wrapper layers.

* * * * *